Nov. 7, 1950          E. A. BRASS          2,528,734

RETARDED SOLENOID TRACTIVE MEANS

Filed July 21, 1945

INVENTOR
EDWARD A. BRASS

BY
A. F. Flournoy
ATTORNEY

Patented Nov. 7, 1950

2,528,734

UNITED STATES PATENT OFFICE 2,528,734

RETARDED SOLENOID TRACTIVE MEANS

Edward A. Brass, Shreveport, La.

Application July 21, 1945, Serial No. 606,318

3 Claims. (Cl. 175—372)

My invention relates to tractive, electro-mechanical devices generally, but more particularly to solenoid operated mechanical devices for use in the controlling of vehicular and pedestrian traffic signalling devices wherein an intermittently rotated camshaft opens and closes various electrical contacts which control the illuminating periods of the "stop," "caution," and "go" lamps.

Heretofore, an accepted method of producing stepped rotation of shafts, as well as accomplishing other mechanical movements, has been through the use of the prior art type of solenoids which derive energy from a source of alternating current. When the alternating current is applied to the field coil of the solenoid, the magnetic field thus established draws an iron plunger into the plunger tube with rapid uncontrolled action which, in the majority of instances, is undesirable, causing wear and short life to parts.

This prior art type of solenoids includes in its construction a laminated, iron plunger that must be loosely fitted into a barrel or plunger tube to make it work at all. The intense heat generated in the electric coil of this prior art type of solenoid makes a loose fit absolutely necessary. If the fit was not made loose, the plunger would expand and freeze tight in the plunger tube until the solenoid cooled sufficiently to release it. The heat generated during the operation of these prior art type solenoids is so intense that the lubrication of them is made impossible.

To overcome some of these defects in the prior art type solenoid above described, some inventors have incorporated in solenoid mechanisms what is known as "dash pots," using either air or oil, or other retarding mechanisms, which, when used in connection with the solenoid, tends to retard the quick acceleration movement of the plunger when the current is applied. The addition of the dash pot arrangement, however, is often complicated and expensive.

The direct current solenoid has also been used which allows a slightly closer fit between the plunger and plunger tube than the alternating current type of solenoid described above, but not enough to allow the plunger to function in the novel manner that the equivalent plunger fuctions in applicant's solenoid as will be explained in this specification. The direct current type solenoid hasn't met with favor for the reason that the source of electric current usually available is the alternating current.

An object of my invention is to provide a solenoid type electro-mechanical tractive means with a built in current rectifier by means of which direct current may be utilized in the operation of the tractive means whether the source of power available is either direct current or alternating current.

Another object of my invention is to provide a solenoid type electro-mechanical tractive mechanism with a current rectifier built into it in which the rectifier functions as a heat radiator for use in keeping the temperature of the solenoid portion of the tractive means at low enough temperature to permit a close fit between a solenoid plunger and the plunger tube in which it moves and to also make possible the use of a lubricant in the plunger tube to minimize the force of friction that would retard the movement of the plunger in the plunger tube.

Another object of my invention is to provide a solenoid type electro-mechanical tractive mechanism in which the plunger tube and plunger member of the solenoid portion of the tractive means is incorporated as parts of a dash pot mechanism adapted to control the movement of the plunger of the solenoid in its movement in and out of the plunger tube of the solenoid.

Other objects and advantages of my invention in electro-mechanical tractive mechanisms will be seen from the following specifications and appended claims when considered with my accompanying drawings illustrating an electro-mechanical tractive means embodying my invention in which:

It is to be understood that, while reference is here made to traffic control systems, other advantageous applications of my invention may be made without departing from the spirit and scope of it as hereinafter disclosed.

In the course of my detailed description of the tractive means itself I will also explain its operation.

Figure 1:
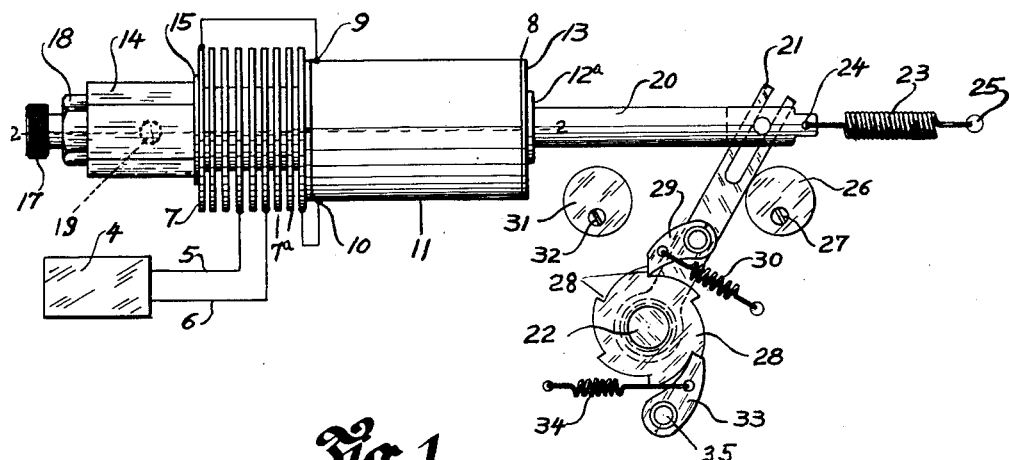
Figure 1 is a longitudinal view of an assembled solenoid type electro-mechanical tractive mechanism embodying my invention showing an application of the same for intermittently rotating a shaft.
Figure 2:
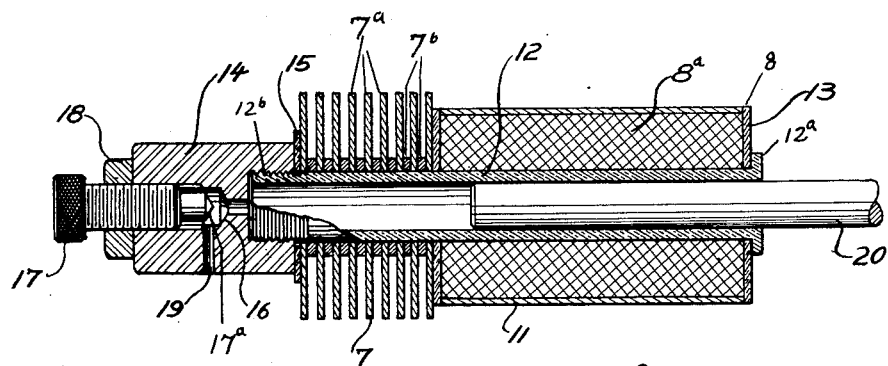
Figure 2 is a longitudinal elevation view in part cross section of a portion of the structure illustrated in Figure 1 taken on line 2—2 of Figure 1.
Figure 3:
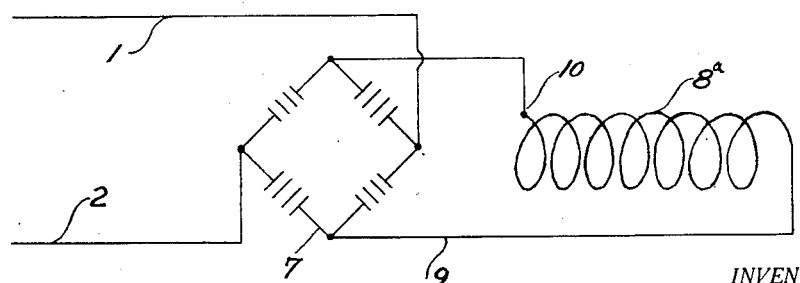
Figure 3 is a circuit diagram.

Referring to Figure 1 of my drawing it is pointed out to the reader that impulses of alternating electric current, coming from a prearranged control unit 4 enter through lines 5 and 6 into a dryplate rectifier 7, wherein they are converted into direct electric current. It is to be noted here that the use of the selenium iron plates 7a in the rectifier in no way hampers or retards the operation of the solenoid 8 by absorbing the magnetic lines of force through the solenoid windings 8a. While copper oxide discs might possibly be used as a rectifier, it has been found in actual practice that, due to the good conductivity of copper, the magnetic field created upon application of current would immediately overlap that of the actual coil windings 8a and momentarily retard the plunger movement. Such a peculiar characteristic of copper has been employed in former devices for the sole purpose of retarding the attraction or release of relay mechanisms by placing these copper "slugs" on one end or the other of the windings. It is not the purpose of this invention to incorporate such features but to minimize them to such an extent that my solenoid, except for the air check valve, will operate as any conventional alternating current solenoid. The actual tests made proved that the eddy currents produced in the rectifier were brought to a minimum by using several discs of selenium iron arranged in the conventional manner to effect a unidirectional flow of current. The full flow of direct current generated by the rectifier is introduced to the solenoid windings 8a at terminals 9 and 10, which windings are enclosed by a suitable housing 11.

The windings 8a of the solenoid 8, as well as the selenium rectifier plates 7a, are fitted around a powdered metal, self-lubricated plunger tube 12, and held in place on one end by a washer 13 placed against the inner side of the flange head 12a of the plunger tube 12. This plunger tube 12 is of the powdered metal type which is familiar to all who use friction bearings. During its manufacture it is impregnated with graphite or other lubricant before it is finally pressed into various shapes and sizes. During use of the material as a friction bearing, the lubricant impregnated in the porous material due to the heat generated by a rotating shaft or the like, comes to the surface to furnish lubrication, hence the term "self-lubricating bearing." While a graphite impregnated material is used in this instance, it is understood that any of the "self-lubricating" types of bearing materials may be used with equal advantage. It can now be seen that the self lubricated plunger tube 12 will provide sufficient lubrication to the slidable plunger 20 for the full length of its stroke. The plunger tube 12 is threaded on its inner end at 12b and screwed into a valve shell 14, against which is placed a plain brass washer 15 thus holding the entire unit together. Within the valve shell 14 is a valve seat 16 against which an adjusting needle valve screw 17 may be placed. The adjusting needle valve screw 17 is provided with a cone point 17a to match the valve seat 16. I employ a lock nut 18 threadedly engaged with the needle screw 17 as a means for locking the needle screw 17 in desired adjusted positions and by which means I am able to allow a regulated flow of air to escape through the air vent 19 when expelled by a movement of the plunger 20.

The plunger 20 is of such diameter as to make an air sealing fit with the self-lubricated plunger tube 12 it is drawn into upon application of a flow of current through the solenoid windings 8. It will be readily seen that upon application of current, the acceleration of the plunger 20 can be controlled by simply adjusting the needle valve screw 17 which controls the amount of air escaping through the venthole 19. That is to say the combination of the plunger 20 in the plunger tube 12 and the air control made up of the valve shell 14 and the needle screw 17 function as a regulated dash pot.

On the outer end of the plunger 20 and slidably connected thereto, is a bifurcated lever 21, the opposite end of which is rotatably mounted on a camshaft 22 which is rotatably mounted in bearings not shown. When the flow of electric current to the windings 8a is stopped, the plunger 20 is drawn to an outward, normal position by a spring 23 connected to the outer perforated end 24 of the plunger 20 and which spring 23 is secured to a retaining pin 25. The outward movement of the plunger 20 caused by the spring 23 is governed by an eccentrically mounted stop 26 which is itself positioned by means of a lock screw 27.

Connected to the camshaft 22 and disposed to rotate therewith is a circular ratch 28 made in the shape of a circular saw. Pivotally connectd to the lever 21 and arranged to engage in the notches 28a of the circular ratch 28 upon movement of the plunger 20, is a pawl 29, held in place by a spring 30. As can be seen from the drawings, when the plunger 20 is drawn into the plunger tube 12, the lever 21, through the action of the pawl 29, will advance said circular ratch 28 to a point where said lever will engage another eccentric stop 31 locked in position by its adjusting screw 32.

A reverse action of the camshaft 22 is prevented by a second pawl 33, pivoted on a pin 35 and held in place by a spring 34.

As explained above to the reader, my solenoid operated tractive means, since it is operated by direct current, does not generate as much heat as it would if operated on alternating current. I have reduced the heat incident to the operation of my tractive means still farther by the design of my rectifier 7 itself and by the manner in which I have incorporated it into my tractive mechanism. The rectifier plates 7a are mounted directly on the self-lubricated plunger tube 12 and they are spaced apart by means of spacing rings 7b. Because of this arrangement the plates 7a of the rectifier 7 function as radiating fins to carry away excess heat from the plunger tube 12. The minimized quantity of heat that is not carried away by the rectifier plates 7a is an advantage in that this heat induces a flow of the lubricant in the self-lubricating plunger tube 12 to its inner surface, the surface on which the plunger 20 slides in its movement in and out of the plunger tube 12.

Having thus described my invention I claim:

1. In a tractive device the combination of a body, a passage that is within and that extends through said body, a valve that is adjustably mounted in said body and extends into said passage to control the rate at which air can flow through said passage, a threaded recess in said body adjacent to and surrounding one end of said passage, the other end of said passage being spaced from said threaded recess and opening to the exterior of said body, a plunger tube of self-lubricating metal, threads on one end of said plunger tube that engage and are held by the threads of said threaded recess in said body, a plunger that is disposed within and is dimensioned so it can reciprocate relative to said plunger tube, an electromagnet winding that is supported by said plunger tube, a plurality of spaced-apart heat-radiating fins mounted on and supported by said plunger tube, said heat-radiating fins being adjacent said body, and a flange on the other end of said plunger tube, said plunger tube being dimensioned so adjustment of the threaded end thereof in said threaded recess of said body will enable said flange to clamp said heat-radiating fins and said electromagnet winding between said body and said flange, said body and said plunger tube coacting to form a dash pot that can maintain the rate of movement of said plunger at a predetermined value, said valve being adjustable to vary said predetermined value, said plunger tube responding to heat generated in said electromagnet winding to provide a continuously lubricated surface on the interior of said plunger tube relative to which said plunger can reciprocate.

2. In a tractive device the combination of a body, a passage that is within and that extends through said body, a valve that is adjustably mounted in said body and extends into said passage to control the rate at which air can flow through said passage, a threaded recess in said body adjacent to and surrounding one end of said passage, the other end of said passage being spaced from said threaded recess and opening to the exterior of said body, a plunger tube of self-lubricating metal, threads on one end of said plunger tube that engage and are held by the threads of said threaded recess in said body, a plunger that is disposed within and is dimensioned so it can reciprocate relative to said plunger tube, an electromagnet winding that is supported by said plunger tube, and a plurality of spaced-apart heat radiating fins mounted on and supported by said plunger tube, said heat-radiating fins being adjacent said body, said body and said plunger tube coacting to form a dash pot that can maintain the rate of movement of said plunger at a predetermined value, said valve being adjustable to vary said predetermined value, said plunger tube responding to heat generated in said electromagnet winding to provide a continuously lubricated surface on the interior of said plunger tube relative to which said plunger can reciprocate.

3. In a tractive device the combination of a body, a passage that is within and that extends through said body, a threaded recess in said body adjacent to and surrounding one end of said passage, the other end of said passage being spaced from said threaded recess and opening to the exterior of said body, a plunger tube of self-lubricating metal, threads on one end of said plunger tube that engage and are held by the threads of said threaded recess in said body, a plunger that is disposed within and is dimensioned so it can reciprocate relative to said plunger tube, an electromagnet winding that is supported by said plunger tube, and a plurality of spaced-apart heat-radiating fins mounted on and supported by said plunger tube, said heat-radiating fins being adjacent said body, said body and said plunger tube coacting to form a dash pot that can maintain the rate of movement of said plunger at a predetermined value, said plunger tube responding to heat generated in said electromagnet winding to provide a continuously lubricated surface on the interior of said plunger tube relative to which said plunger can reciprocate.

EDWARD A. BRASS.

REFERENCES CITED

The following references are of record in the file of this patent:

UNITED STATES PATENTS

| Number | Name | Date |
|---|---|---|
| 747,853 | Cheyney | Dec. 22, 1903 |
| 1,032,946 | Ross | July 16, 1912 |
| 1,149,275 | McElroy | Aug. 10, 1915 |
| 1,171,208 | Jones | Feb. 8, 1916 |
| 1,195,449 | Du Belle | Aug. 22, 1916 |
| 1,213,937 | Nielssen | Jan. 30, 1917 |
| 1,389,625 | Churchward | Sept. 6, 1921 |
| 1,493,259 | Green | May 6, 1924 |
| 1,748,073 | Leoty | Feb. 25, 1930 |
| 1,792,512 | Siegmund | Feb. 17, 1931 |
| 1,899,502 | Hachfeld | Feb. 28, 1933 |
| 2,200,109 | Wilckens | May 7, 1940 |
| 2,377,733 | Waller | June 5, 1945 |
| 2,400,088 | Hayslett | May 14, 1946 |
| 2,452,030 | Hughes | Oct. 26, 1948 |

FOREIGN PATENTS

| Number | Country | Date |
|---|---|---|
| 305,182 | Great Britain | Mar. 27, 1930 |
| 569,847 | Germany | Feb. 9, 1933 |

OTHER REFERENCES

"U. S. Patents on Powdered Metallurgy," pages 55–60. U. S. Dept. of Commerce, Nat. Bur. of Standards Misc. Pub. No. M–184, issued July 1, 1947.